(No Model.) 2 Sheets—Sheet 1.

T. R. CRANE.
GRAIN DRILL.

No. 372,125. Patented Oct. 25, 1887.

WITNESSES:
Robert L. Clemmitt.
John E. Morris

INVENTOR:
Thos. R. Crane

BY Chas. B. Mann
ATTORNEY.

N. PETERS. Photo-Lithographer, Washington, D. C.

(No Model.) 2 Sheets—Sheet 2.
T. R. CRANE.
GRAIN DRILL.
No. 372,125. Patented Oct. 25, 1887.
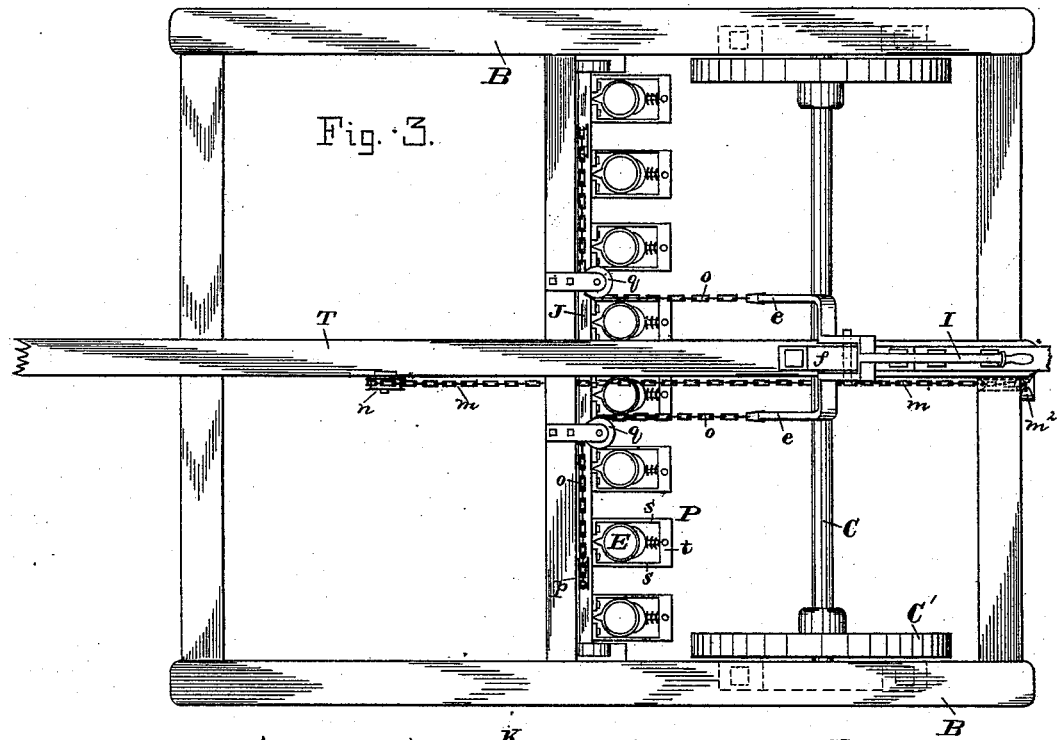
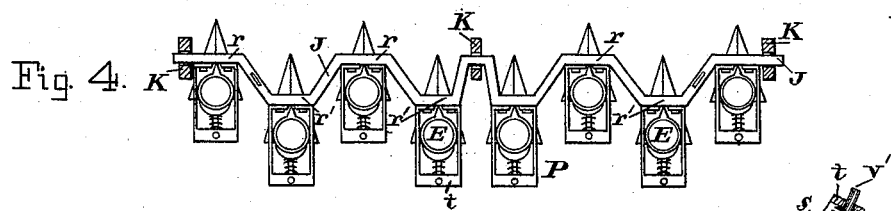
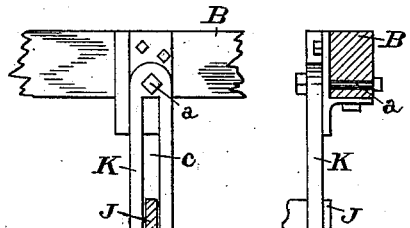 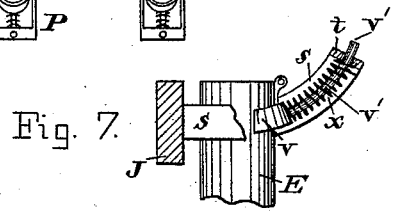
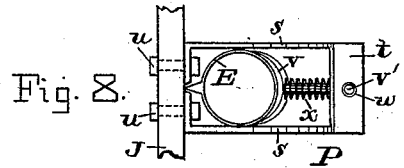
WITNESSES:
Robert L. Clemmitt.
John E. Morris.
INVENTOR:
Thos. R. Crane
BY Chas. B. Mann
ATTORNEY.

UNITED STATES PATENT OFFICE.

THOMAS R. CRANE, OF HEATHSVILLE, VIRGINIA.

GRAIN-DRILL.

SPECIFICATION forming part of Letters Patent No. 372,125, dated October 25, 1887.

Application filed June 21, 1887. Serial No. 241,991. (No model.)

*To all whom it may concern:*

Be it known that I, THOMAS R. CRANE, a citizen of the United States, residing at Heathsville, in the county of Northumberland and State of Virginia, have invented certain new and useful Improvements in Grain-Drills, of which the following is a specification.

This invention relates to an improved drill for sowing grain or seed, and is illustrated in the accompanying drawings, in which—

Figure 1:
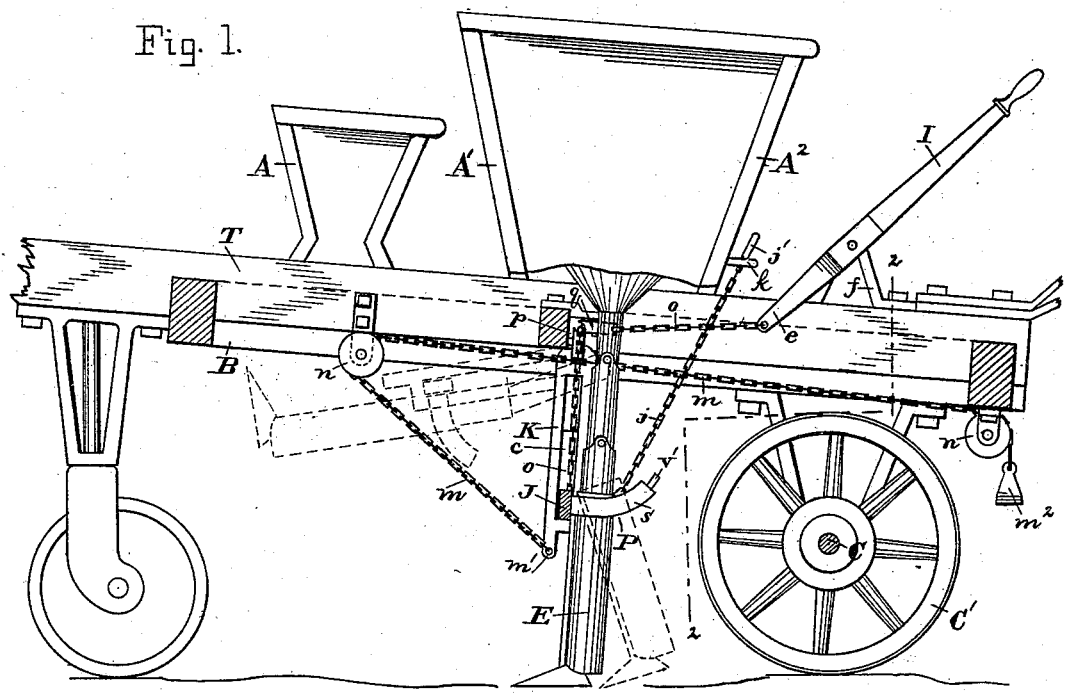
Figure 2:
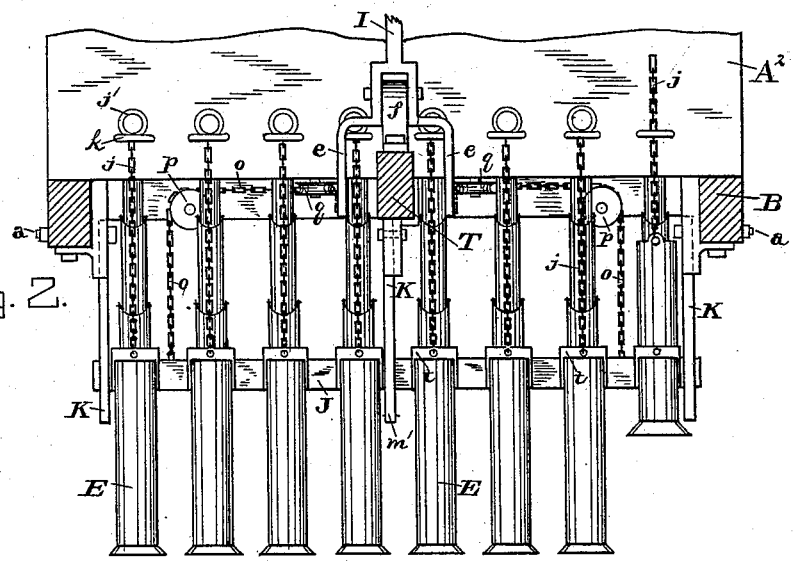

Figure 1 is an elevation of my machine, the greater part of which shows a longitudinal section. Fig. 2 is a vertical cross-section on line 2 2, looking forward, or to the left. Fig. 3 is a top view of the frame and parts which are seen when the hoppers are removed. Fig. 4 shows a modification in the shape of the crosswise bar. Figs. 5 and 6 are views of the hanger-arm. Figs. 7 and 8 are views of the drill-tube clamp.

The letters A A' A$^2$ designate the hoppers for seed, grain, or fertilizer. One or all may be used. These are supported on a frame, B, which is mounted on an axle, C, having two wheels, C'; or, instead of the said wheels, a roller may be employed. Each hopper has a suitable feed device, not necessary to describe here.

Drill-tubes E convey the grain and fertilizer from their respective hoppers to the ground. Each drill-tube is separately or independently raised and lowered vertically by a chain, $j$, having at its upper end a ring, $j'$, which, when the tube E is down, rests on a suitable support, $k$, back of the hopper. All the drill-tubes E are attached to a bar, J, which extends horizontally crosswise below the frame, and at each end and at the center is supported and vertically guided by a vertical hanger-arm, K, the upper end of which is pivoted by a bolt, $a$, to the frame B. The horizontal crosswise bar J and all the drill-tubes E attached to it may be raised and lowered together vertically, or all swung up toward the front of the machine, as indicated by broken lines in Fig. 1. Thus provision is made for two distinct movements of all the drill-tubes. To effect this the hanger-arms have vertical slots $c$, which serve as guides, and the ends of the said bar J occupy the slots $c$. The bar J may therefore be raised and lowered vertically in said slots $c$. Two chains, $o$, are employed to raise vertically. Each has one end attached to the crosswise bar J and passes over a pulley, $p$, turning in a vertical plane, and thence around a pulley, $q$, turning in a horizontal plane, and has the other end attached to one of the two prongs $e$ of a lever, I, which is pivoted to a base, $f$, bolted on the tongue or draft-pole T. This lever I is located back of the hoppers, and each of the two prongs $e$ at the lower end projects down on an opposite side of the draft-pole. The driver may grasp the upper end of the lever, and by pushing it forward will vertically raise the crosswise bar J and all the drill-tubes. The means for swinging up toward the front the hanger-arms K, bar J, and drill-tubes E comprise the chain $m$, one end of which is attached at $m'$ to the center arm K and passes over pulleys $n$, and has at the other end, near the seat L, a stirrup, $m^2$. By the driver placing his foot in the stirrup $m^2$ and bearing down thereon the drill-tubes will be swung up toward the front.

It will thus be seen that I have provided in one machine for raising all the drill-tubes at once by a vertical lift, and also for raising them on pivots by swinging them upward toward the front. This combination of the direct up-and-down movement of all the drill-tubes at once, and also the up-and-down movement separately of each drill-tube and the upward-swinging movement to the front, is a new and useful improvement.

The crosswise bar J may be straight, as in Figs. 1, 2, and 3, or it may be irregular or zigzag, as shown in Fig. 4. Where made in this form, two series of drill-tube rests are provided—to wit, a front series, $r$, and a rear series, $r'$. At each rest a clamp, P, is secured to the bar, and said clamp attaches a drill-tube E. By having the bar J zigzag shape, as shown, and every other one of the drill-tubes attached to the front rests and the alternates ones to the rear rests, the spaces between the drill-tubes will allow grass or trash to pass and avoid choking the machine.

A special form of clamp P is here provided, and is shown in detail in Figs. 7 and 8. The clamp comprises two side bars, $s$, which are united at their ends by a cross-bar, $t$. The two side bars are secured to the bar J by bolts $u$. A crescent-shaped presser-block, $v$, has position between the two side bars, s, and is provided with a shank-rod, v', which passes through a hole, w, in the cross-bar t. A spiral spring, x, is interposed between the presser-block v and the cross-bar.

The drill-tube E has position between the two side bars and the block v presses against it. Under ordinary circumstances of drilling, the presser-block v and spring x will hold the drill-tube E close to the bar J; but should the point or furrow-opener of the drill-tube come in contact with an obstacle in the ground the presser-block v will yield and allow the tube E to move back to a limited extent between the two side bars.

Having described my invention, I desire to secure by Letters Patent of the United States—

1. In a drill, the combination of a frame having vertical hanger-arms K, pivoted to the frame, and each arm provided with a vertical slot, c, a bar, J, crosswise of the frame and occupying the said slots in the arms, drill-tubes attached to said crosswise bar, a lever, I, chains o, attached to the crosswise bar and connected with the said lever, pulleys n on the frame, and a chain, m, attached to one of the pivoted hanger-arms and passed over the said pulleys, whereby the crosswise bar and drill-tubes may be raised and lowered together vertically or swung up toward the front of the machine.

2. In a drill-tube, the combination of a frame having vertical hanger-arms K, a zigzag-shaped bar, J, extending horizontally crosswise of the machine and supported and vertically guided by said hanger-arms, said bar having a front series, r, and a rear series, r', of drill-tube rests, and every other drill-tube E clamped to the front rests and the alternate tubes to the rear rests, as set forth.

3. In a drill, the combination of an attaching-bar, J, and a drill-tube clamp comprising two side bars, s, united at their ends by a cross-bar, t, provided with a hole, w, a presser-block, v, between the two side bars and provided with a shank-rod, v', which passes through the hole in the cross-bar, and a spring, x, interposed between the said presser-block and cross-bar.

4. The combination of a vertically-movable crosswise bar, J, the drill-tubes E, and clamps P, secured to the said crosswise bar, each clamp surrounding one of the drill-tubes and provided with a spring to allow the drill-tube to move back.

5. In a drill, the combination of a frame having vertical hanger-arms K, a bar, J, extending horizontally crosswise of the machine and supported and vertically guided by said arms, drill-tubes E, and a yielding clamp, P, surrounding each drill-tube and secured to the said bar.

6. The combination of a vertically-movable crosswise bar, J, the drill-tubes E, a yielding clamp, P, attaching each drill-tube to the said bar, and a lift-chain, j, attached to each drill-tube.

In testimony whereof I affix my signature in the presence of two witnesses.

THOMAS R. CRANE.

Witnesses:
 JOHN E. MORRIS,
 JNO. T. MADDOX.